United States Patent [19]

Wheeler et al.

[11] 4,359,820
[45] Nov. 23, 1982

[54] PIPE CASING CUTTER

[76] Inventors: Lionel H. Wheeler, 7654 Hereford, Houston, Tex. 77087; James P. Adair, Rte. 3, Box 234B, Leander, Tex. 78641

[21] Appl. No.: 203,787
[22] Filed: Nov. 3, 1980
[51] Int. Cl.³ .............................................. B26D 3/16
[52] U.S. Cl. ................................................ 30/97; 30/98
[58] Field of Search .................. 30/92, 94, 95, 96, 97, 30/98

[56] References Cited

U.S. PATENT DOCUMENTS

| | | | |
|---|---|---|---|
| 2,349,499 | 5/1944 | Hayden | 30/97 X |
| 2,563,069 | 8/1951 | Roberts | |
| 2,769,234 | 11/1956 | Young | |
| 2,769,235 | 11/1956 | Martois | 30/97 |
| 3,834,019 | 9/1974 | Smeltzer | 30/92 |
| 3,942,248 | 3/1976 | Sherer et al. | 30/97 |

OTHER PUBLICATIONS

E. H. Wachs Company Trav-L-Cutter Pipe Saw-described in attached advertising material.
E. H. Wachs Company Wachs-Strickler Ratchet Pipe Cutter-described in attached advertising material.

Primary Examiner—Stephen G. Kunin
Assistant Examiner—R. P. Olszewski
Attorney, Agent, or Firm—Fulbright & Jaworski

[57] ABSTRACT

An apparatus for cutting pipe and casing. An apparatus for cutting pipe and casing having a hinged frame and using the revolution of the device about the workpiece to simultaneously effect cutting of the workpiece.

9 Claims, 2 Drawing Figures

PIPE CASING CUTTER

BACKGROUND OF THE INVENTION

1. Field of the Invention

The present invention relates to an improved apparatus for cutting pipe and casing. The invention also relates to the construction of a pipe cutter that is suitable for field use utilizing conventional pneumatic or hydraulic power means.

2. DESCRIPTION OF PRIOR ART

A number of devices useful for cutting and/or bevelling steel, wrought, and cast iron pipe are disclosed in the prior art. Applicant is aware of the following prior art which is deemed material to the examination of this application and which is the closest prior art of which the Applicant is aware: U.S. Pat. Nos. 2,769,234; 2,563,069; E. H. Wachs Company Trav-L-Cutter Pipe Saw; and E. H. Wachs Company Wachs-Strickler Ratchet Pipe Cutter.

The Portable Pipe Bevelling Apparatus of U.S. Pat. No. 2,769,234 is a portable pipe bevelling device with a cutter attached to the head of the apparatus which revolves about the workpiece. The Power Operator Hack Saw of U.S. Pat. No. 2,563,069 has a cutting blade that is moved laterally as it is fed further into the workpiece, but which does not revolve about the workpiece. The Trav-L-Cutter has separate power sources for the machine feed and the cutting wheel. Attachment to the workpiece is made via a tension timing chain which serves as a guide track. Cutting of the workpiece is completed in a single revolution about the pipe. The Ratchet Pipe Cutter contains a ratchet mechanism that feeds the cutting knife upon each revolution of the machine.

None of the above-mentioned prior art apparatuses teaches, claims or suggests the structural and operational features of the present invention, whereby its rotational motion about the workpiece is translated into movement of the cutting blade perpendicular to the outer surface of the workpiece and in the plane in which the cut is to be made.

SUMMARY OF THE INVENTION

The present invention is directed to an apparatus for cutting pipe or casing in the field, including use in underwater operations.

Often it is necessary to cut pipe or casing to a specified length or to cut out damaged sections. This invention facilitates such operations by utilizing a portable cutting device that is powered by conventional hydraulic or pneumatic means.

The ring frame of the cutter is attached to the outer surface of the pipe or casing below the point at which the cut is to be made. One embodiment utilizes a hinged ring frame so that the cutter is easily emplaceable at any point along the pipe without it being necessary for the cutter to be applied from an end of the pipe. Furthermore, the cutter does not require concentric attachment to the pipe. The importance of this feature is easily recognized from the fact that pipes are never perfectly round and usage of prior art tools on uneven surfaces often results in breakage of the tools.

The driveshaft of the hydraulic or pneumatic motor is connected to a sprocket, herein referred to as the drive sprocket. This sprocket communicates with an upper roller chain which is attached to the outer edge of the drive ring which is positioned around the pipe's outer surface simultaneously with the attachment of the ring frame. Upon application of the power source, the drive sprocket's revolution is thereby translated to revolution of the drive ring around the pipe.

As the drive ring revolves, a crank plate assembly, including a sprocket herein referred to as the crank plate sprocket, is revolved by means of the crank plate sprocket's connection with a lower roller chain attached to the ring frame. The revolution of the crank plate assembly, which is mounted on the drive ring, is transformed, by a cam follower attached to that assembly and situated within an elongated opening of the crank arm assembly, into movement of the crank arm assembly in a plane perpendicular to the outer surface of the pipe.

Attached to the crank arm assembly, and likewise in a plane perpendicular to the pipe's outer surface, is a blade or cutter. The cutter can be shaped to cut bevels and lands so that the cut pipe can be immediately welded or otherwise utilized. A ratchet mechanism assembly shown in one preferred embodiment may be utilized to control both the position of the cutting blade in relation to the surface to be cut and the amount of force applied by the cutting blade. The ratchet mechanism assembly is mounted on the drive ring so that it rotates about the pipe with the cutting blade. As the drive ring revolves about the pipe, the cutting blade is thereby repeatedly brought into contact with the outer surface of the pipe along its entire circumference after a series of revolutions of the drive ring. This motion permits the cutting blade to cut the pipe in the plane formed by that series of contacts. The ratchet mechanism assembly permits the feed of the blade or cutter to be adjustable according to the desired depth per revolution. Additionally, the cutter can be adapted to cut various shapes.

In order to continuously adjust the position of the cutting blade, and thereby allow it to cut deeper into the pipe upon successive contacts with the pipe, one preferred embodiment utilizes a rod or other surface at a fixed point on the stationary ring frame and positioned so that it strikes the ratchet mechanism during each revolution.

The operation of the ratchet mechanism assembly, as described below in more detail, applies force on the cutting blade, forcing it into the pipe to be cut. This is known as "positive feed." This feature is important when using the cutter on pipe that has internal pressure. This is frequently the case in oil field operations, where internal pressure of 30,000 pounds per square inch is common. Without positive feed on the cutter or blade, the internal pressure would force the blade out of the pipe. In addition, the positive feed spring pressure provides an even feed of the cutter or blade around the pipe as the cutting operation proceeds.

It is, therefore, an object of the present invention to provide an apparatus for cutting pipe in the field.

Another object of the present invention is to provide an apparatus easily affixed to the pipe to be cut in the field.

Yet another object of the present invention is to provide a pipe cutter which is adaptable for underwater use.

Yet another object of the present invention is to provide a pipe cutter which functions in the field with a minimum of manual operation.

A further object of the present invention is to provide a pipe cutter with a cutting mechanism which automatically adjusts itself to cut increasingly deeper into the pipe.

A still further object of the present invention is to provide a pipe cutter which penetrates the pipe at a uniform rate on the pipe's outer surface.

Another object of the present invention is to provide a pipe cutter which may be operated by either hydraulic or pneumatic sources.

Another object of the present invention is to provide a pipe cutter which can utilize standard blades for cutting.

Another object of the present invention is to provide a pipe cutter with a hinged frame so that the cutter can be easily employed at any desirable point on the pipe.

Another object of the present invention is to provide a pipe cutter for pipe of either round or non-round configuration.

Another object of the present invention is to provide a pipe cutter which does not require concentric attachment to the pipe.

Other and further objects, features and advantages will be apparent from the following description of the presently preferred embodiments of the invention, given for the purpose of disclosure, when taken in conjunction with the accompanying drawing.

BRIEF DESCRIPTION OF THE DRAWING

The invention will be more readily understood from a reading of the following specification and by reference to the accompanying drawing, forming a part whereof, wherein an example of one embodiment of the invention is shown, and wherein.

DESCRIPTION OF THE PREFERRED EMBODIMENTS

Figure 1:
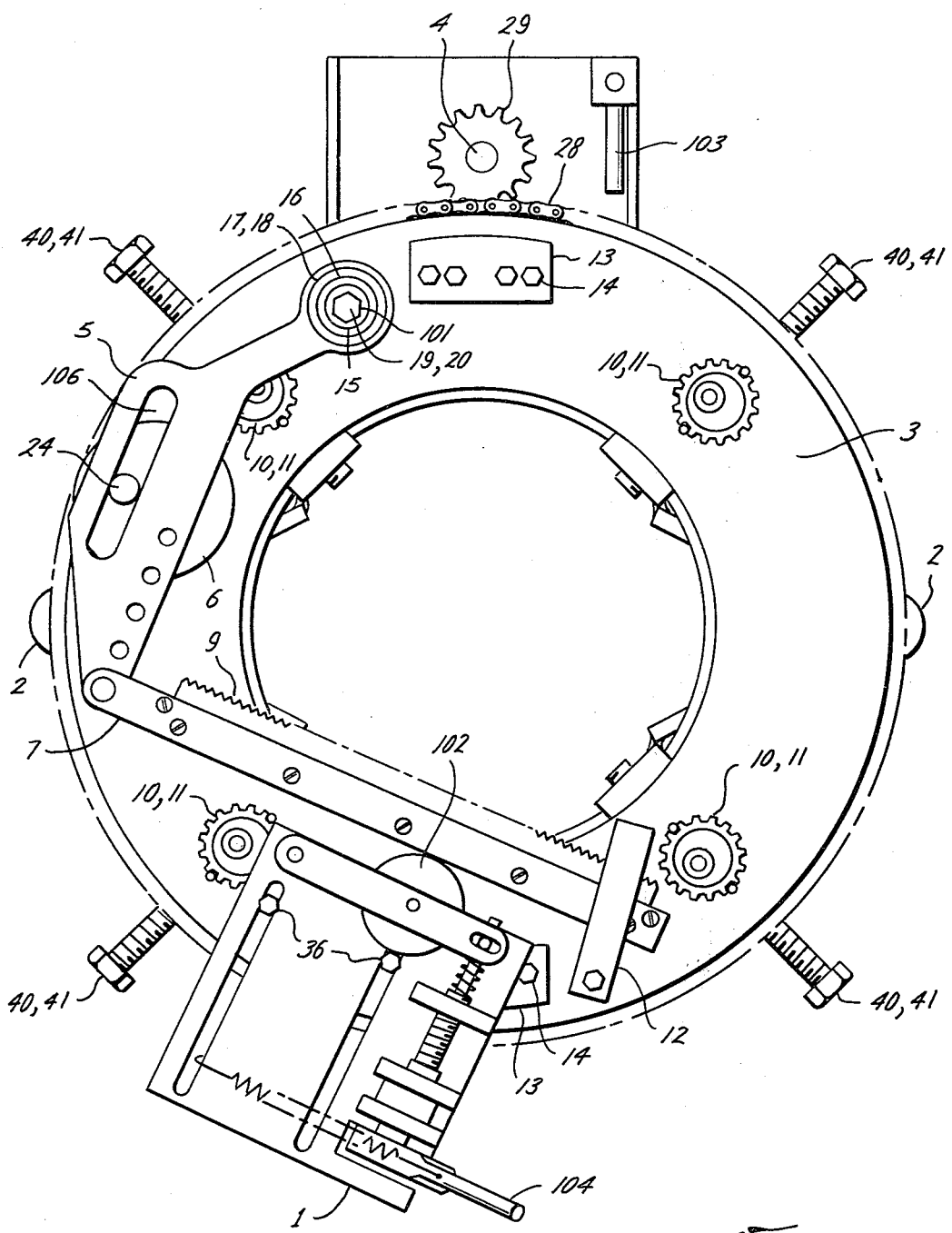
FIG. 1 is a top view of the pipe casing cutter.
Figure 2:
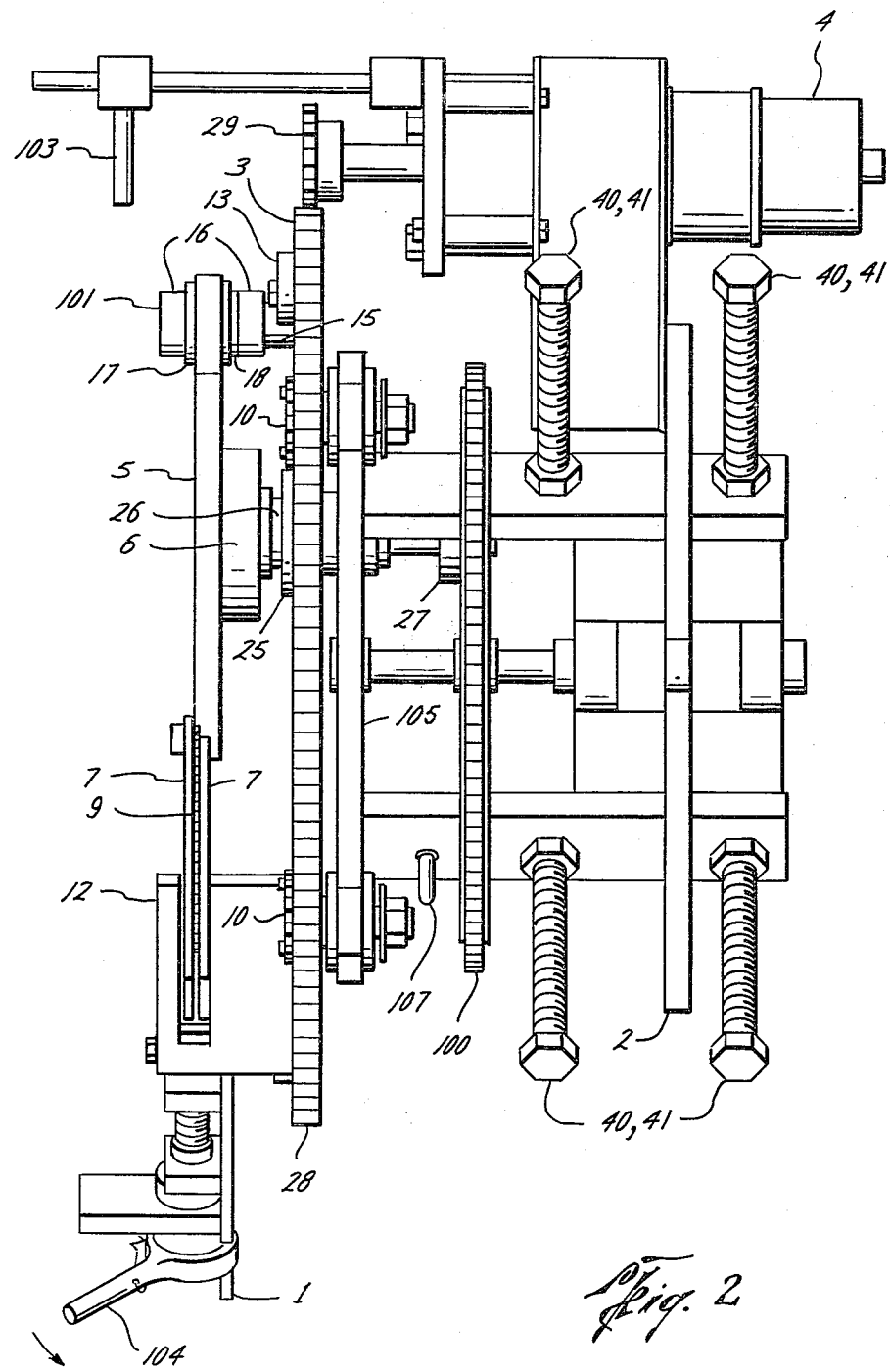
FIG. 2 is a side view of the pipe casing cutter.

By way of illustration and not limitation, this detailed description presents one preferred embodiment of my invention. It will be readily apparent to one skilled in this art that my invention can be incorporated into many prior art devices in a manner similar to the way in which it is here illustrated without departing from the scope of my invention.

Referring to the drawing, the reference numeral 4 generally designates the power means, shown in this embodiment as an electric or pneumatic motor, used as a source of power for operating the device. The motor 4 is mounted to the means for attachment to the pipe or casing, shown generally in this embodiment as the hinged ring frame 2. A lifting bail 107 is attached to the hinge point of hinged ring frame 2 to provide a means for movement of the tool to various work areas.

Attached to the ring frame 2 is the roller ring 105, which is generally round in shape and has an opening to accomodate the pipe to be cut. Generally disc shaped to also accomodate the pipe within it is the drive ring 3. In communication with the roller ring 105 is the plurality of rollers 11 and the roller assemblies 10 which are attached to the drive ring 3 so that the drive ring 3 may be revolved around the pipe while the roller ring 105 itself remains in a fixed position.

To prepare for operation, the hinged ring frame 2, the drive ring 3, and the roller ring 105 are opened so that they can be simultaneously placed around the pipe near the area of the pipe that is to be cut. The frame 2, ring 3, and roller ring 105 are then closed. The drive ring 3 is held in closed position by the drive ring joining plate bolts 14 which connect the drive ring joining plate 13 to the drive ring 3. The upper roller chain 28 is then attached to the outer edge of the drive ring 3.

Located at several positions on the ring 2 are the alignment bolts 40 and the alignment nuts 41, positioned so that after the ring frame 2 is closed around the workpiece, the bolts 40 can be individually turned with a conventional wrench, thereby bringing the pipe to a fixed position within the central opening of the drive ring 2 and ring frame 3. It will be appreciated, however, that the invention's operation, described herein, does not require the workpiece to be aligned concentrically within the drive ring 2 and ring frame 3.

Attached to the driveshaft of motor 4 is the drive sprocket 29, which is positioned so as to contact the links of upper roller chain 28. In this manner, application of the appropriate electrical or pneumatic source to the motor 4 will cause revolution of the drive sprocket 29 and, consequentially, revolution of the upper roller chain 28 and the drive ring 3. The drive ring 3 is able to revolve about the pipe while the ring frame 2 remains stationary because of the operation of the roller 11 and roller assemblies 10.

Also attached to the ring frame 2 after the frame 2 is closed is the lower roller chain 100, which is also stationary during the operation of the cutter. Mounted on the drive ring 3 is the crank plate assembly 6 which extends below and above the drive ring 3. However, the crank plate assembly bushings 26 and bushing housing 25 are utilized in conventional manner so that the crank plate assembly 6 is free to revolve about its own axis although it is mounted on the drive ring 3. Attached to the lower end of the crank plate assembly 6 is the crank plate sprocket 27. The crank plate sprocket 27 is positioned so as to contact the links of lower roller chain 100. With this construction, revolution of the drive ring 3 around the workpiece causes the combination of the crank plate sprocket 27 and the crank plate assembly 6 to revolve about its own axis.

Attached to the upper side of crank plate assembly 6 and at a point not at the center of the assembly's upper surface, is the cam follower 24. Mounted to the drive ring 3 near the crank plate assembly 6 is the pivot assembly 101 which includes the crank arm pivot pin 15, the crank arm set collar 16, the crank arm tube 17, the crank arm bushing 18, the crank arm bolt 19, and the crank arm lockwasher 20. One end of the crank arm 5 is attached to this pivot assembly 101 so that the fixed end is stationary with respect to the drive ring 3 while the crank arm 5 is able to revolve about that fixed end. In an intermediate area of the crank arm 5 is formed the elongated opening 106. The crank arm 5 is positioned so that it rests upon the upper surface of the crank plate assembly 6 with the cam follower 24 protruding into the elongated opening 106 of the crank arm 5. With this construction, revolution of the crank plate assembly 6 results in motion of the crank arm 5 within a plane parallel to and above the upper surface of the drive ring 3.

Rotatably connected to the end of the crank arm 5 opposite the pivot assembly 101 is the tool holder 7 which includes upper and lower pieces in the embodiment illustrated by the drawing. Attached to the tool holder 7 is the cutting tool, shown in the drawing as the hacksaw blade 9. The blade 9 is positioned so that as the crank plate assembly 6 is revolved about its own axis the revolution of the cam follower 24 effects the motion of the crank arm 5 and the tool holder 7 in a plane parallel to and above the upper surface of the drive ring 3, with the cutting tool 9 alternately striking and retracting from the surface of the workpiece in the plane in which it is to be cut. The illustrated embodiment includes the tool guide 12 mounted to the drive ring 3 to limit the distance to which the cutting tool is retracted. As the drive ring 3 continues its revolutions around the workpiece, the blade 9 repeatedly strikes and penetrates the outer surface of the workpiece in the plane to be cut.

In the illustrated embodiment, mounted to the drive ring 3 is the ratchet mechanism assembly, referred to generally by the numeral 1. The position of this assembly relative to the center of the workpiece can be varied by sliding the assembly 1 on the drive ring 3 until the desired position is located and then tightening ratchet assembly bolt 36. The cutting tool stop 102 is mounted on, and is part of, the ratchet mechanism assembly 1. The stop is attached and positioned so that adjustment of the ratchet within the assembly brings the stop 102 either closer to or farther from the tool holder 7. Thus, adjustment of the ratchet mechanism 1 allows the operator to bring the cutting tool 9 closer to the center of the workpiece as the cutting process progresses. This adjustment also increases or decreases the force with which the cutting tool 9 strikes the workpiece at the moment of each impact therewith.

As an alternative to manual adjustment of the ratchet mechanism assembly 1, one or more adjustment rods 103 may be mounted on the ring frame 2 in such a position that one or more times during each revolution of the drive ring 3, the adjustment rod 103 contacts the ratchet handle 104 of the assembly 1. In this manner, the cutting tool 9 is brought progressively closer to the center of the workpiece as the cutting operation continues.

The foregoing disclosure and description of the invention is illustrative and explanatory thereof and various changes in the size, shape and materials, as well as in the details in the illustrated construction may be made within the scope of the appended claims without departing from the spirit of the invention.

What is claimed is:

1. A pipe cutter, comprising:
   attachment means for implacement on the pipe to be cut;
   power means connected to the attachment means;
   cutting means for cutting the pipe, the cutting means movably connected to the attachment means;
   revolution means for revolving the cutting means around the pipe;
   application means for applying the cutting means to the pipe, wherein said application means comprises:
   a lower roller chain mounted to the attachment means;
   a crank plate sprocket in communication with the lower roller chain;
   a crank plate assembly attached to said crank plate sprocket and mounted to the revolution means so that the crank plate assembly revolves about its own axis upon rotation of the revolution means, and;
   a crank arm assembly and cam follower attached to the crank plate assembly for transforming the revolution of the crank plate assembly into lateral movement of the cutting means; and
   adjusting means for adjusting the cutting force of the cutting means.

2. The device of claim 1, wherein the attachment means is a hinged ring frame.

3. The device of claim 1, where the power means is a hydraulic motor.

4. The device of claim 1, where the power means is a pneumatic motor.

5. The device of claim 1, where the power means is an electric motor.

6. The device of claim 1, where the cutting means is a hacksaw blade.

7. The device of claim 1, wherein the power means has a drive shaft and wherein the revolution means includes:
   a drive sprocket attached to the drive shaft of the power means;
   an upper roller chain in communication with said drive sprocket, and;
   a drive ring on the circumference of which is attached the upper roller chain.

8. The device of claim 1, wherein the adjusting means is a ratchet mechanism assembly attached to the cutting means.

9. The device of claim 1, wherein the adjusting means includes:
   a ratchet mechanism assembly connected to the cutting means, and;
   a rod connected to the attachment means for activating the ratchet once during each revolution of the drive ring.

* * * * *

UNITED STATES PATENT OFFICE
CERTIFICATE OF CORRECTION

Patent No. 4,359,820  Dated November 23, 1982

Inventor(s) Lionel H. Wheeler and James P. Adair

It is certified that error appears in the above-identified patent and that said Letters Patent are hereby corrected as shown below:

In Column 4, line 6, between "ring" and "2" insert
-- frame --.

Signed and Sealed this

Eighth Day of February 1983

[SEAL]

Attest:

GERALD J. MOSSINGHOFF

Attesting Officer   Commissioner of Patents and Trademarks